(12) United States Patent
Tremblay

(10) Patent No.: US 6,446,785 B1
(45) Date of Patent: Sep. 10, 2002

(54) LUMBER TURNING TOOL

(76) Inventor: Benoit Tremblay, 597 St. Cyrille, Normandin, Quebec (CA), G8M 4H3

(*) Notice: Subject to any disclaimer, the term of this patent is extended or adjusted under 35 U.S.C. 154(b) by 5 days.

(21) Appl. No.: 09/653,666

(22) Filed: Sep. 1, 2000

(30) Foreign Application Priority Data

Sep. 2, 1999 (CA) .............................................. 2281349

(51) Int. Cl.⁷ ............................................. B65G 47/252
(52) U.S. Cl. ...................... 198/404; 198/410; 198/411; 198/416
(58) Field of Search .............................. 198/339.1, 403, 198/404, 410, 416; 414/758–760; 144/245.2

(56) References Cited

U.S. PATENT DOCUMENTS

| | | | | |
|---|---|---|---|---|
| 1,567,753 A | * | 12/1925 | Kelly ......................... | 198/404 |
| 2,000,292 A | * | 5/1935 | Miller ........................ | 198/404 |
| 3,157,071 A | * | 11/1964 | Pachell ...................... | 198/411 |
| 3,914,919 A | * | 10/1975 | Boissy et al. ................ | 53/62 |
| 5,040,662 A | * | 8/1991 | Clark et al. ................ | 198/408 |
| 5,620,081 A | * | 4/1997 | Kivits ........................ | 198/404 |

FOREIGN PATENT DOCUMENTS

GB  2 092 976  * 8/1982  ................. 198/410

* cited by examiner

*Primary Examiner*—Christopher P. Ellis
*Assistant Examiner*—Mark A. Deuble
(74) *Attorney, Agent, or Firm*—Eric Fincham

(57) ABSTRACT

A lumber turning device for use with a conveyer having spaced apart lumber moving therealong whereby the lumber may be turned through 180° so that all faces of the lumber may be visually inspected. A first arrangement has a four lobed member whereby a first one of the lobes will extend upwardly above the conveyer with a front surface facing a first lumber piece such that when the locked first lumber piece contacts the front surface of the first one of the lobes, the member will rotate and a rear face of an adjacent lobe will lift the lumber piece to rotate the same through 180°. Other embodiments illustrate members which may turn alternate pieces of lumber.

8 Claims, 8 Drawing Sheets

LUMBER TURNING TOOL

FIELD OF THE INVENTION

The present invention relates to an apparatus for turning lumber and more particularly, to automated lumber turning devices for use with a conveyer.

BACKGROUND OF THE INVENTION

In a typical lumber mill, boards are cut from a log and then transferred to further processing such as edging. The processed boards or lumber may then be transferred for further processing. One of the final steps of producing dimensional lumber of a required side is that of a classification of the wood. This is performed on a visual basis by classification inspectors.

In the processing of the lumber, conveyers are widely used for transporting the lumber from one location to another. Lugged transfer decks are often used to singulate boards for sorting and grading. A lugged transfer deck usually comprises a series of parallel longitudinally oriented chains which all move at the same speed. Lugs or fingers project upwardly at spaced intervals along the chains. The lugs on the chains are lined in transfers rows across the transfer deck. The lumber lies transversely on top of the chains and as they move, the rows of lugs push the boards or lumber along the transfer deck.

For inspection purposes, all four sides of the dimensioned lumber must be visually inspected. In order to do so, it has been known in the art to use inspectors who stand alongside the lugged transfer deck or conveyer. As the board approaches the inspector, the inspector is able to visually access two faces of the board. The inspector will then turn the board through 180° to inspect the remaining two faces. The operation of turning the lumber pieces is a repetitious one and must be done at a relatively high speed. As a result, many inspectors suffer from repetitive stress injuries as well as other types of injuries which can occur to the fingers.

It has been proposed in the art to use systems which turn the lumber pieces automatically. However, such systems have generally tended to be very complex and use a number of different mechanical pieces integrated together. Furthermore, they do not always guarantee that the inspector will have visual access to all four surfaces of the lumber. Thus, known systems have been operative to turn the pieces by means of acceleration belts which are utilized to push the piece forwardly and turn the board forwardly. However, as aforementioned, this does not permit the inspector to have visual access to all four faces of the lumber.

SUMMARY OF THE INVENTION

It is therefore an object of the present invention to provide a lumber turning device for use with a conveyer having spaced apart lumber moving therealong and which device permits an inspector to see all four sides of a piece of lumber.

It is a further object of the present invention to provide a lumber turning device which is capable of turning lumber moving along a conveyer and which device does not require synchronization with the conveyer.

It is a further object of the present invention to provide a lumber turning device which can be adapted to turn alternating pieces of lumber moving along a conveyer.

According to one aspect of the present invention, there is provided a lumber turning device for use with a conveyer having spaced apart lumber moving therealong, the device comprising a shaft, a member rotatably mounted on the shaft, the member having a plurality of lobes extending radially outwardly with respect to the shaft, indexing means to prevent free rotation of the member and to stop rotation thereof when the lobes are in desired position, each of the lobes having a front surface and a rear surface, the arrangement being such that when the device is mounted alongside the conveyer, a first one of the lobes will extend upwardly above the conveyer with a front surface facing a first lumber piece whereby when the first lumber piece contacts the front surface of a first one of the lobes, the member will rotate and a rear face of a adjacent lobe will lift the first lumber piece to rotate the first lumber piece through 180° and redeposit the first lumber piece on the conveyer.

According to a further aspect of the present invention, there is provided a lumber turning device for use with a conveyer having spaced apart lumber moving therealong, the device comprising a shaft, a first member mounted on the shaft, means for rotating the shaft, the means for rotating being synchronized with the conveyer speed, the first member having an arm extending radially outwardly therefrom, the arm having a wood abutment surface and a wood turning surface, the wood abutment surface and the wood turning surface being angled with respect to each other, the arrangement being such that in a first position, the arm has the wood abutment surface positioned to contact the first side surface of a first piece of lumber moving along the conveyer and the wood turning surface being arranged to contact the bottom surface of the one piece of lumber and raise and turn the one piece of lumber through greater than 90° rotation such that the one piece of lumber is placed on the conveyer with the top and bottom surfaces being reversed.

In a further aspect of the present invention, there are provided singulating devices which may be used either in conjunction with the wood turning device of the present invention or alone in other applications.

In a first embodiment of the invention, there is provided a rotatable member mounted on a shaft and which member does not require a separate drive means, but rather is powered by the movement of the wood or lumber itself. In this respect, the lumber will contact one face of the lobe and cause the member to turn.

In other embodiments of the invention, various combinations of wood turning devices may be employed. Thus, for example, the wood turning device may turn every piece of wood, every alternate piece of wood, or any other combination desired.

BRIEF DESCRIPTION OF THE DRAWINGS

Having thus generally described the invention, reference will be made to the accompanying drawings, illustrating embodiments thereof, in which.

DESCRIPTION OF THE PREFERRED EMBODIMENTS

Figure 1:
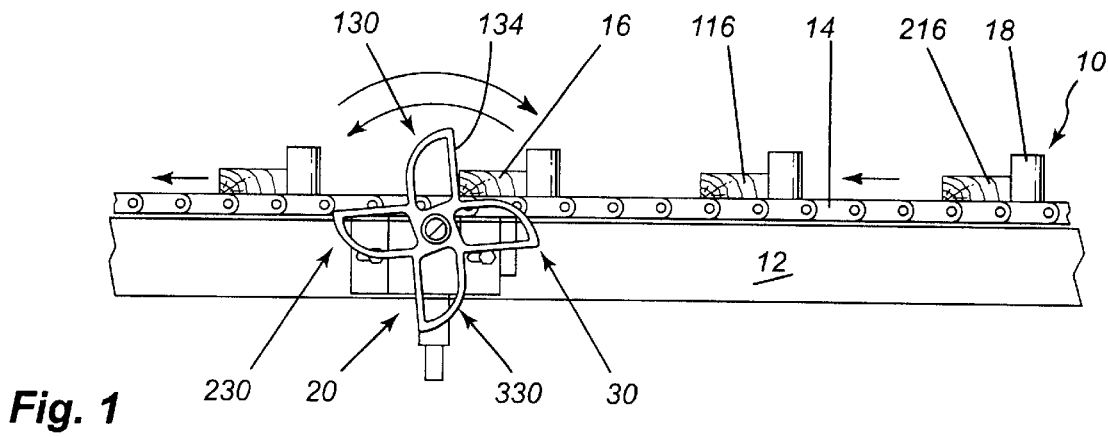
FIG. 1 is a side elevational view of a conveyer carrying pieces of lumber and illustrating a first embodiment of a lumber turning device according to the present invention.

Referring to the drawings in greater detail and by reference characters thereto, there is illustrated in FIGS. 1 to 4 a first embodiment of a lumber turning device and which lumber turning device is generally designated by reference numeral 20.

Lumber turning device is designed to be used with a conventional conveyer 10 as utilized in the lumber industry. Conveyer 10 includes a side rail 12 and a chain 14 upon which the wood used to be transported. Fingers or lugs 18 project upwardly from chain 14 and carry pieces of lumber 16, 116, 216 therealong. The above arrangement is a conventional one well known in the lumber industry—it will be understood that a plurality of synchronized chains are normally employed.

Lumber turning device 20 includes a base member 22 having a pair of apertures 24 formed therein. Bolts 26 pass through aperture 24 to secure base 22 to side rail 12.

Extending from base 22 is a rotatable shaft 28. Mounted on shaft 28 is a four lobe member generally designated by reference numeral 32. Member 32 has four identical lobes 30, 130, 230 and 330. Similar reference numerals in the appropriate hundreds series are used for similar parts as each lobe is substantially identical.

Figure 4:
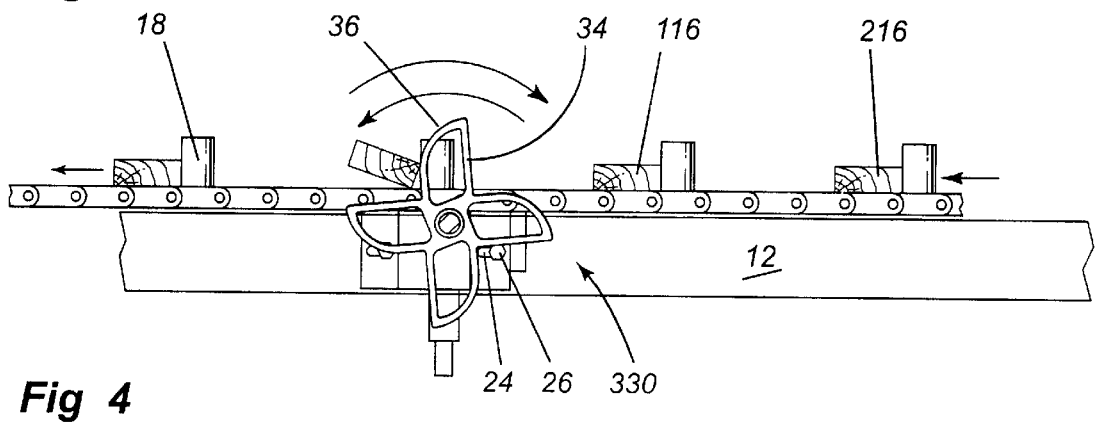

Lobe 30, as may be best seen in FIG. 4, has a planer front surface 34 and an arcuate rear surface 36.

Figure 2:
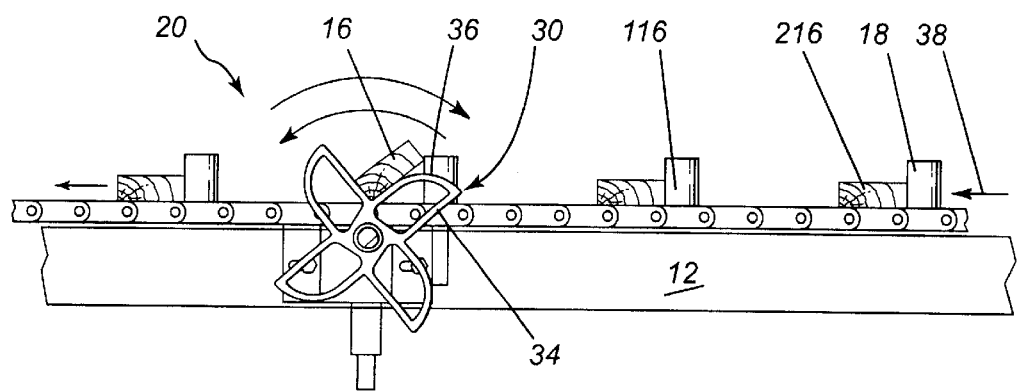
FIGS. 2 to 4 are views similar to FIG. 1 illustrating the sequence of operation of the lumber turning device.
Figure 3:
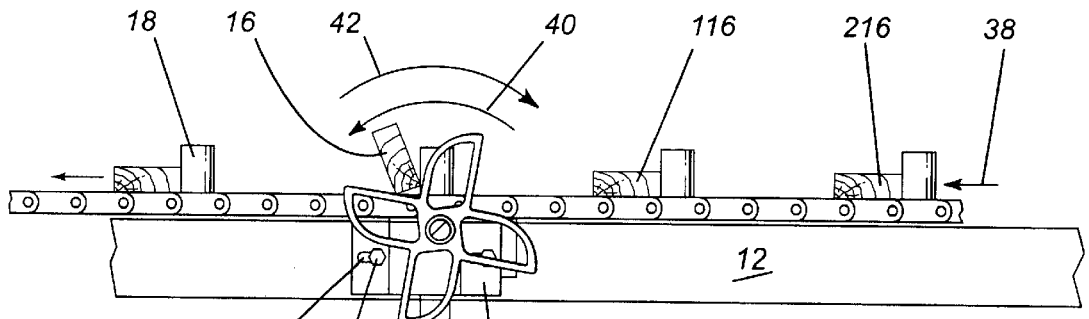

In operation, the conveyer moves along in the direction indicated by arrow 38. Initially, lumber 16 will contact a front surface 134 of lobe 130. This will cause member 32 to start to rotate. As shown in FIG. 2, the rotation will cause rear surface 36 of lobe 30 to raise lumber 16. Continued rotation, as shown in FIGS. 3 and 4, will cause lumber 16 to rotate through 180°.

With this arrangement, a wood inspector and classifier is initially able to see the front and upper surfaces of lumber 16. Upon turning of the lumber through 180°, the inspector is then able to see what were the rear and bottom surfaces of the wood.

Appropriate means for indexing the member 32 to the four operative positions may be provided; such indexing systems are well known in the art.

Figure 5:
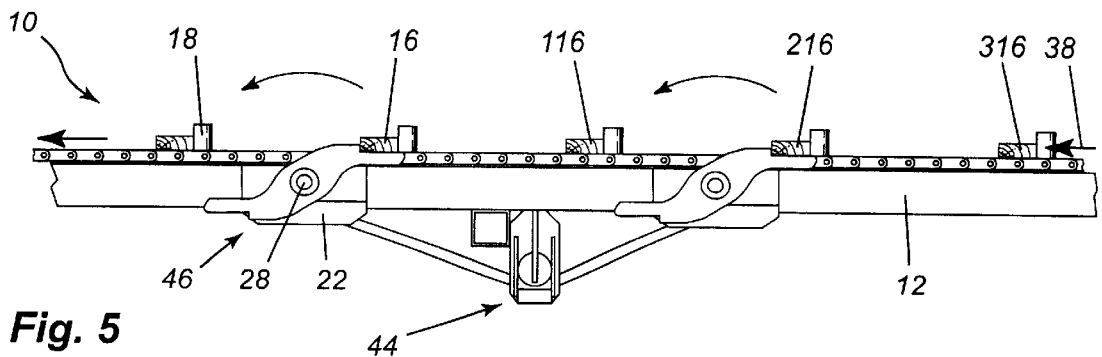
FIG. 5 is a side elevational view of a conveyer carrying pieces of lumber and illustrating a second embodiment of a lumber turning device according to the present invention.
Figure 6:
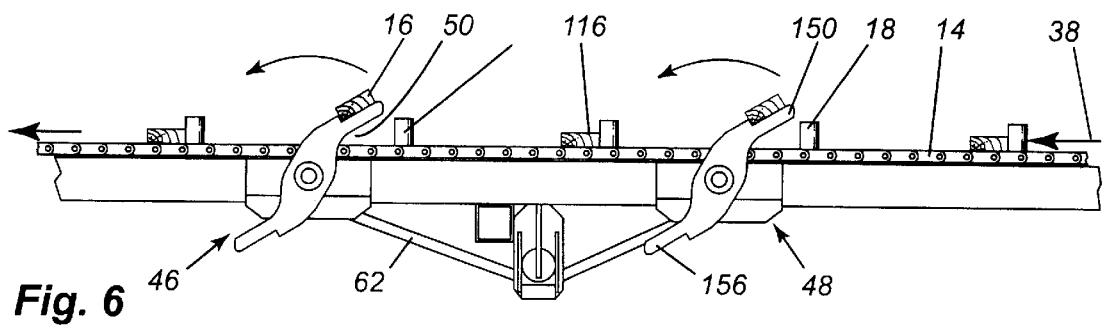
FIGS. 6 and 7 are side elevational views similar to FIG. 5 illustrating the sequence of operation of the lumber turning device thereof.
Figure 7:
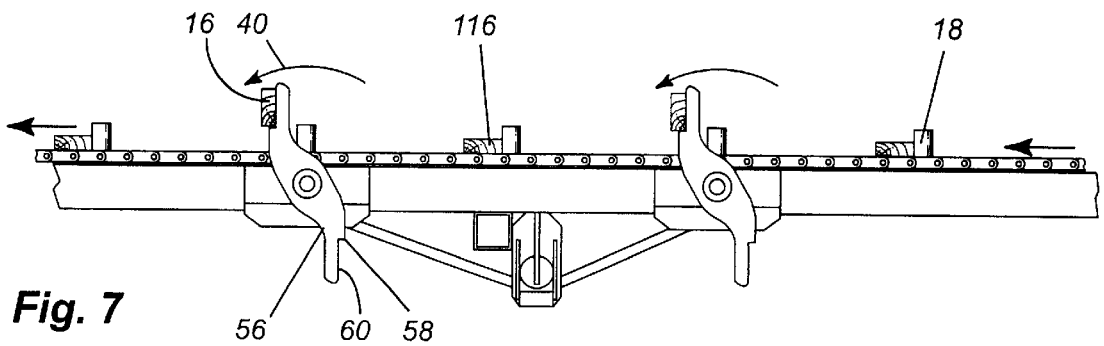

Turning to the embodiment of FIGS. 5 to 7, similar reference numerals are employed for similar components. Thus, in this embodiment, there is again provided a conventional conveyer 10 having a side rail 16, chain 14 and lugs or fingers 18 mounted thereon.

The lumber turning device is designated by reference numeral 44 and includes a first lumber turning member 46 and a second lumber turning member 48 mounted in a spaced apart relationship. Each are substantially identical and reference numerals in the 100s are used for second member 48.

First lumber turning member 46 is mounted on a shaft 28 and includes a first arm or lobe 50 and a second arm or lobe 56 which is diametrically opposed thereto. First arm 50 has a wood abutment surface 52 and a wood turning surface 54. Second arm 56 likewise includes a wood abutment surface 58 and a wood turning surface 60.

In this embodiment, member 46 is rotatably driven through a drive shaft 62 which is connected to a central drive 64. Any suitable type of drive may be employed.

In operation, as shown in FIG. 5, when lumber 16 contacts wood abutment surface 52, rotation of member 46 will cause wood turning surface to contact the underside or bottom face of lumber 16 and raise the same as illustrated in FIG. 6. Continued rotation, as shown in FIG. 7, will cause lumber 16 to be rotated through 180° and with the former upper surface now becoming the bottom surface. In a manner similar to that described with respect to FIGS. 1 to 4, all four faces now can be visually inspected.

The arrangement is FIGS. 5 to 7 is such that each of devices 46 and 48 turn each piece of lumber.

Figure 8:
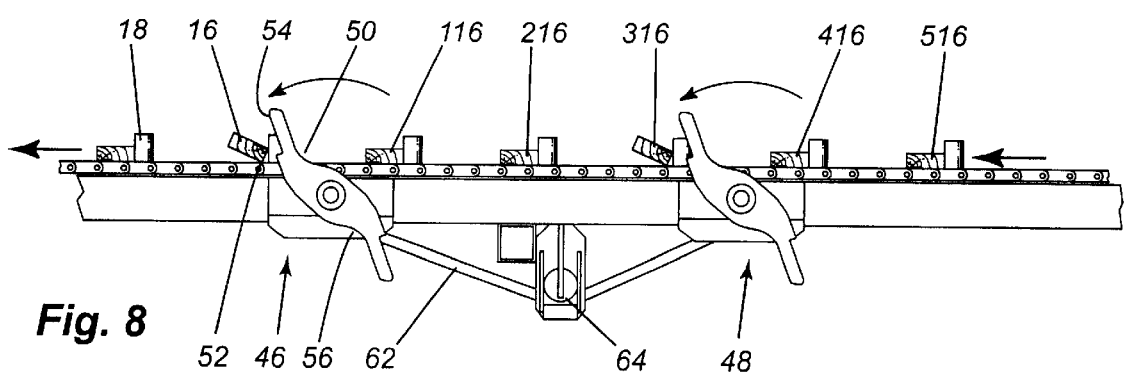
FIG. 8 is a side elevational view of a conveyer carrying pieces of lumber and illustrating a third embodiment of a lumber turning device according to the present invention.
Figure 9:
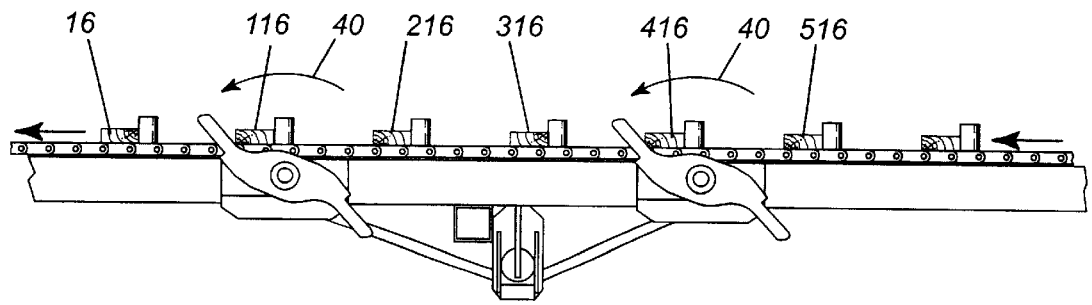
FIGS. 9 and 10 are side elevational views similar to FIG. 8 illustrating the sequence of operation of the lumber turning device thereof.
Figure 10:
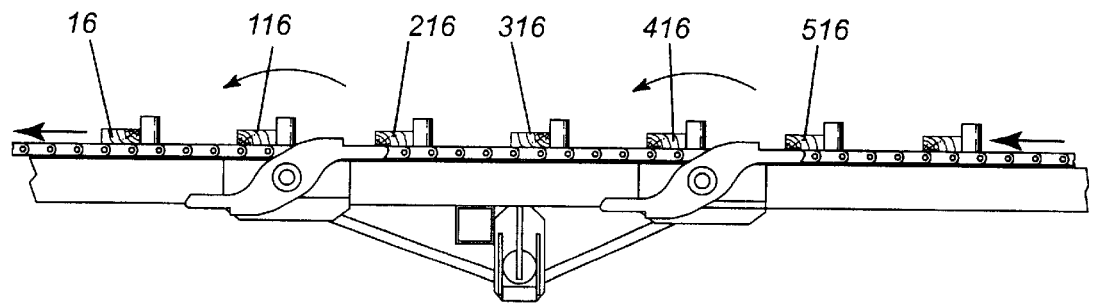

In the embodiment of FIGS. 8 to 10, it will be noted that the fingers 18 are spaced closer together. As a result, in this embodiment, first member 46 will only turn alternate pieces of lumber as will second member 48. In particular, first member 46, in the illustrated embodiment, will turn pieces of lumber 16, 216, 416 while second member 48 will turn pieces 116, 316 and 516.

Figure 11:
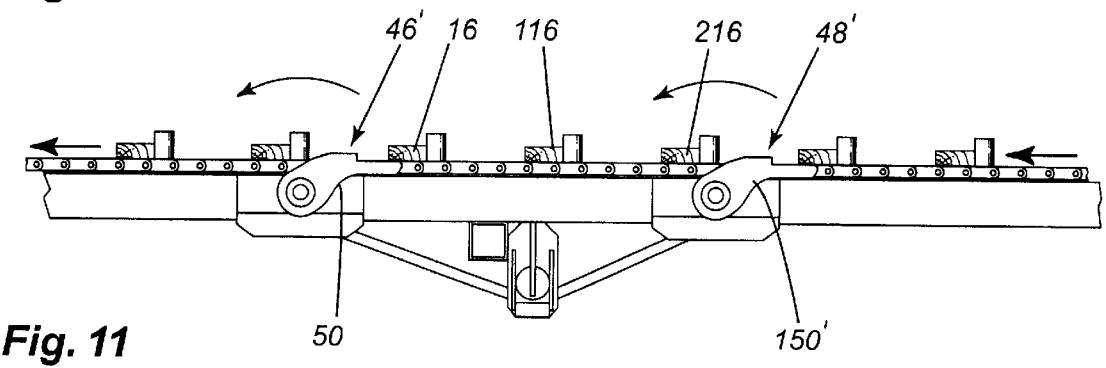
FIG. 11 is a side elevational view of a conveyer carrying pieces of lumber and illustrating a further embodiment of a lumber turning device according to the present invention.

In the embodiment of FIG. 11, there are provided first and second lumber turning members 46' and 48', each of which only have a single arm 50' and 150' respectively. Naturally, any number of such lumber turning members may be provided to turn a desired number of boards at a specified interval.

Figure 12:
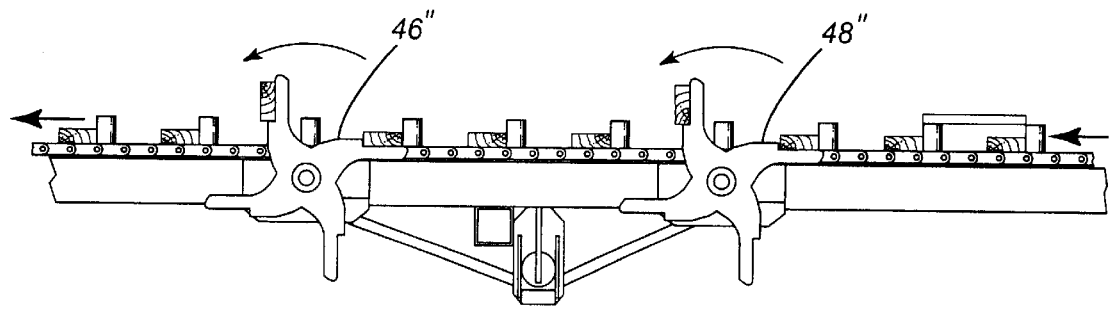
FIG. 12 is a side view similar to FIG. 11 illustrating a further embodiment of a lumber turning device.

In the embodiment of FIG. 12, lumber turning devices 46" and 48" each have four arms or lobes for turning each piece of lumber on the conveyer.

Figure 13:
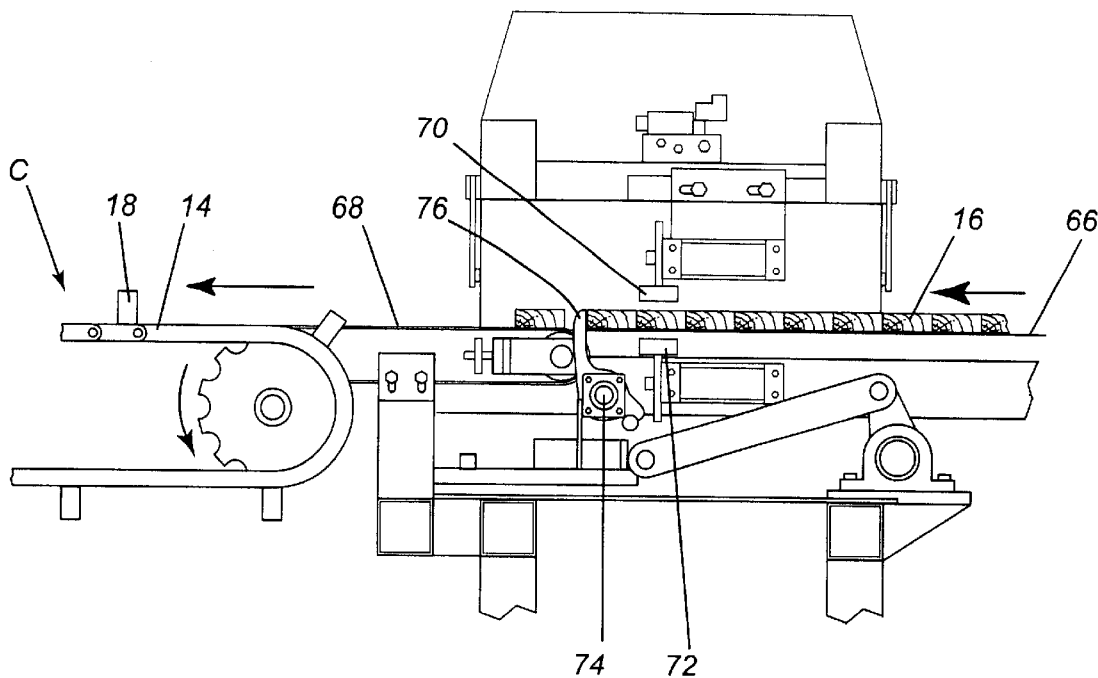
FIGS. 13 to 16 illustrate a singulating device for a conveyer.

Referring now to FIGS. 13 to 16, there is illustrated a singulating device which may be employed to singulate boards from a first conveyer to a second conveyer, the latter being of the type used for the inspection of lumber. As shown in FIG. 13, there is provided a conveyer C of the type having a chain 14 with fingers 18 extending upwardly therefrom. The lumber is moved from a first conveyer 66 to a transfer conveyer 68.

At the output end of conveyer 66, there is provided an upper clamping jaw 70 and a lower clamping jaw 72, each clamping jaw 70, 72 being suitably verti cally driven in a conventional fashion. A singulating arm 76 mounted on shaft 78 is moveable between a first retaining position shown in FIGS. 13 and 14 and a second position illustrated in FIG. 15. The motion of singulating arm 76 is tied into the operation of jaws 70, 72 and the speed of conveyer 68 and conveyer C.

Figure 14:
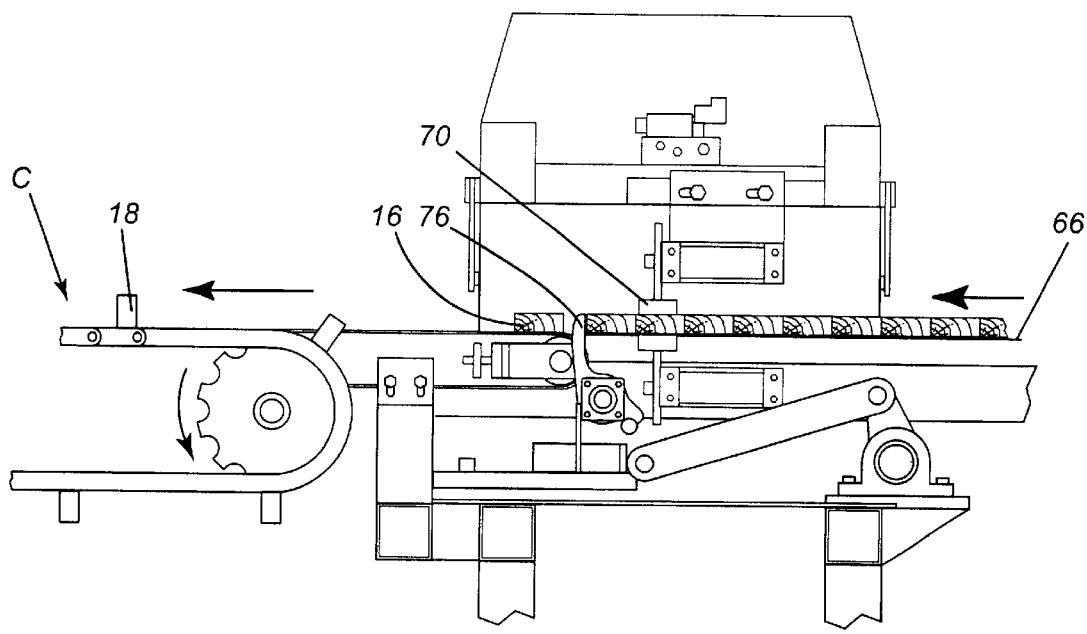
Figure 15:
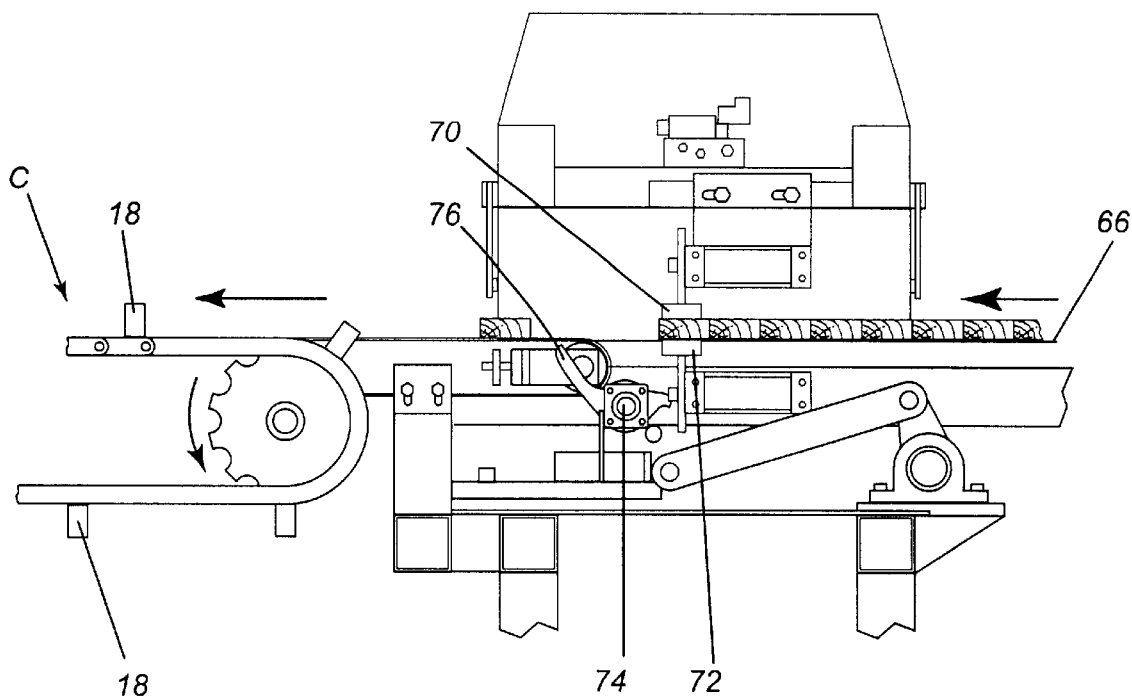
Figure 16:
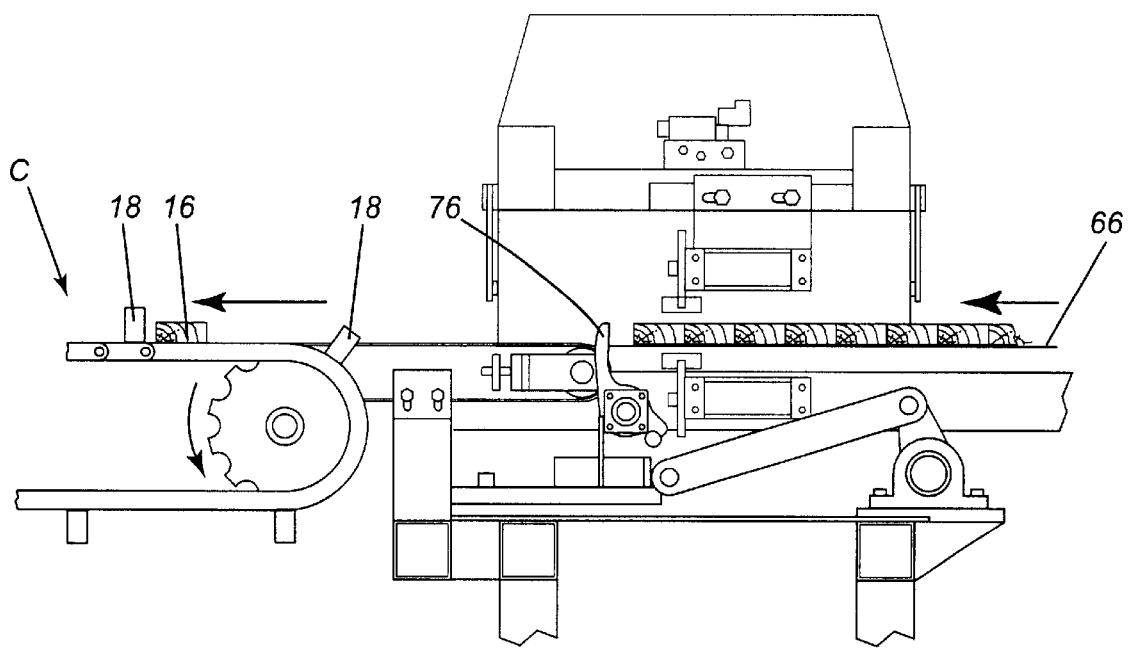
Figure 17:
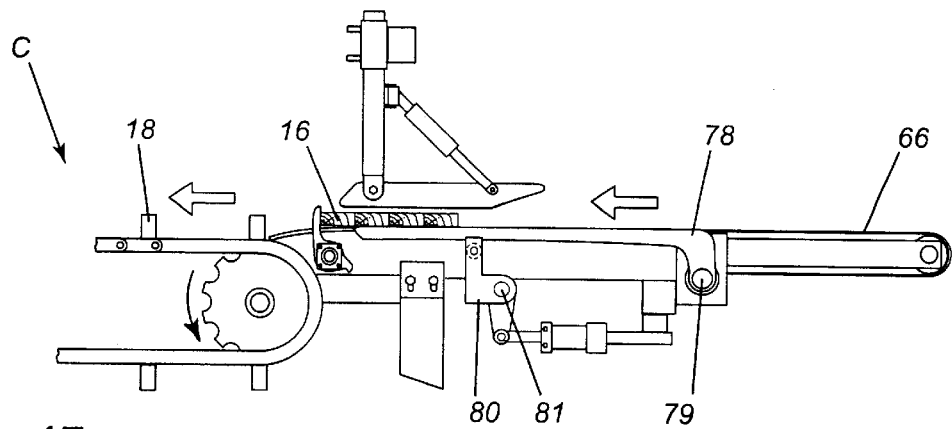
FIGS. 17 to 20 are side elevational views illustrating the operation of a different type of singulating device.
Figure 18:
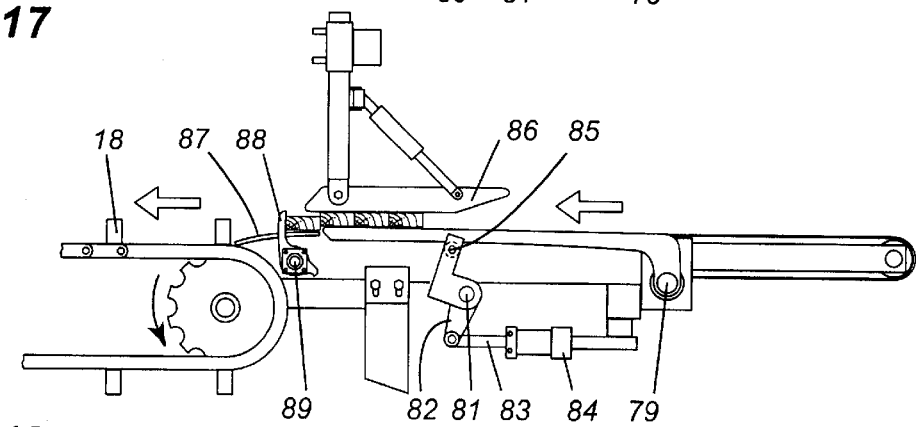
Figure 19:
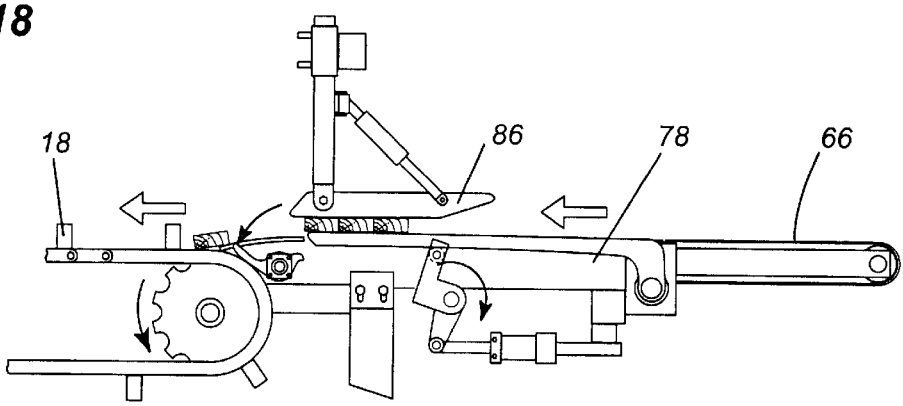
Figure 20:
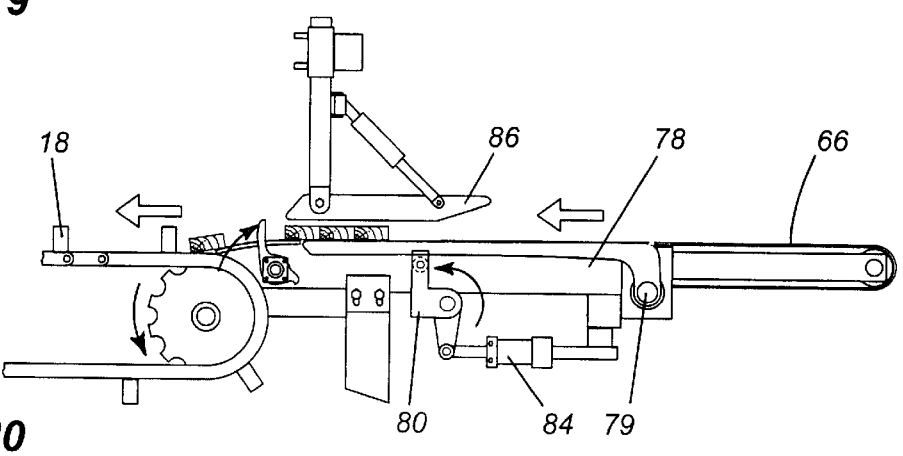

Thus, as shown in FIGS. 13 and 14, the clamping of jaws 70 and 72 retains the lumber 16 from passing singulating arm 76. At the desired point in time, singulating arm 76 is moved to the position shown in FIG. 15 and a single board is permit ted to pass with upper clamping jaw 70 and lower clamping jaw 72 retaining the subsequent piece of lumber.

The sequence is then repeated.

In the embodiment of FIGS. 17 to 20, there is illustrated a further embodiment of a singulating device.

In this embodiment, there is provided a first conveyer 66 upon which the lumber is traveling and conveyer C similar to that of the previously described embodiment. Situated above conveyer 66 at the output end thereof, there is provided an upper clamping plate 86.

An arm 78 is pivotably connected to a suitable frame portion at pivot point 79. In turn, there is provided a lifting member 88 which is pivotably connected at pivot point 81. A first end 82 of lifting member 80 is operatively connected to a piston arm 83 of a hydraulic cylinder 84.

Second end 85 of lifting member 80 is in an abutting relationship to a lower surface of arm 78.

At the output end of conveyer 66, there is also provided a transfer plate 87 and a singulating member 88 mounted on shaft 89.

In operation, as may be seen in FIGS. 17 to 20, lumber 16 is retained at the output end of conveyer 66 by singulating member 88. When it is desired to allow one board to proceed, hydraulic cylinder 84 is operated to drive piston arm 83 and thus push first end 82 of lifting member 80 to cause an upper pressure to be exerted on second end 85 which in turn contacts the underside of arm 78. This clamps the boards between upper plate 86 and arm 78.

Singulating member 88 is then moved to permit a first piece of lumber to move and the process is repeated.

Figure 21:
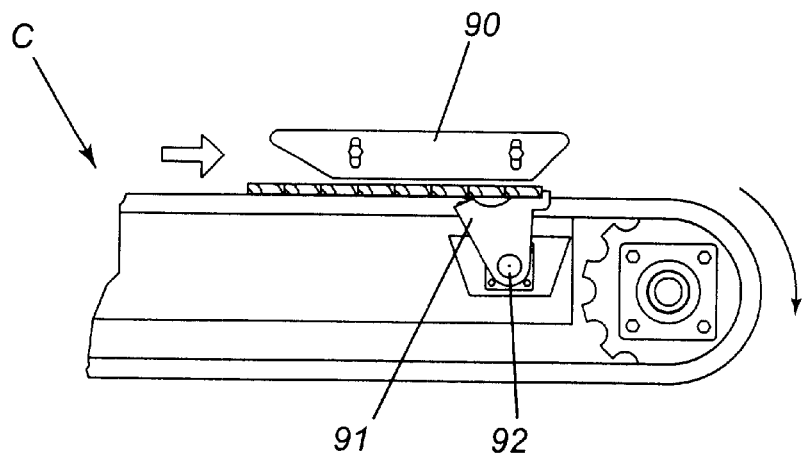
FIGS. 21 to 23 illustrate a further singulating device used in an embodiment of the present invention.
Figure 22:
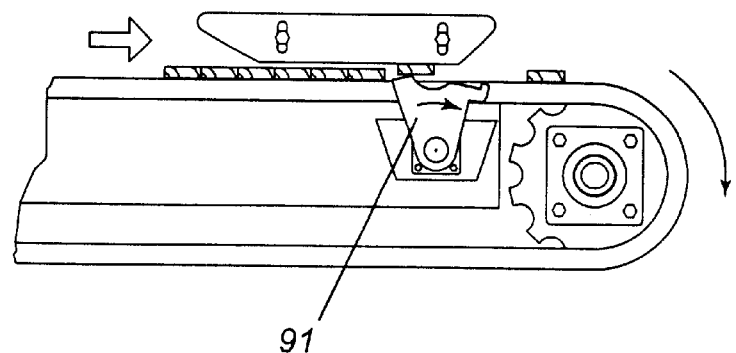
Figure 23:
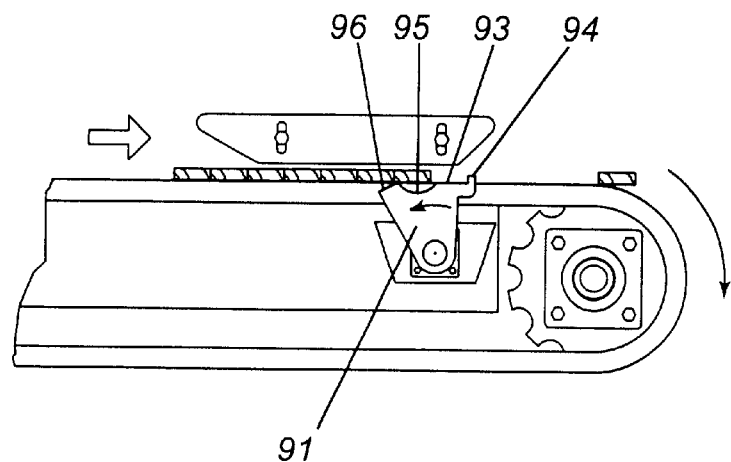

In the embodiment of FIGS. 21 to 23, there is provided a singulating device for a conveyer C. The singulating device comprises a singulating member 91 pivotably mounted at pivot point 92 to a suitable frame portion of the conveyer. The upper surface of singulating member 91 includes a flat surface 93 which terminates at a forward end in a stop member 94. Rearwardly of flat surface 93, there is provided an inwardly extending arcuate recess 95 while at the rear end, there is provided a pusher element 96. Mounted above singulating member 91 is a upper plate 90 which may be resiliently biased.

In operation, as shown in FIG. 21, singulating member 91 acts to retain boards on conveyer C by means of abutting with stop element 94. Upon pivotal movement of singulating member 91, as shown in FIG. 22, a first piece of lumber is free to move while pusher element 96 raises the next piece of lumber against upper plate 90. Upon the return movement of singulating member 91, the second piece of lumber will abut stop member 94. The process can then be repeated.

Figure 24:
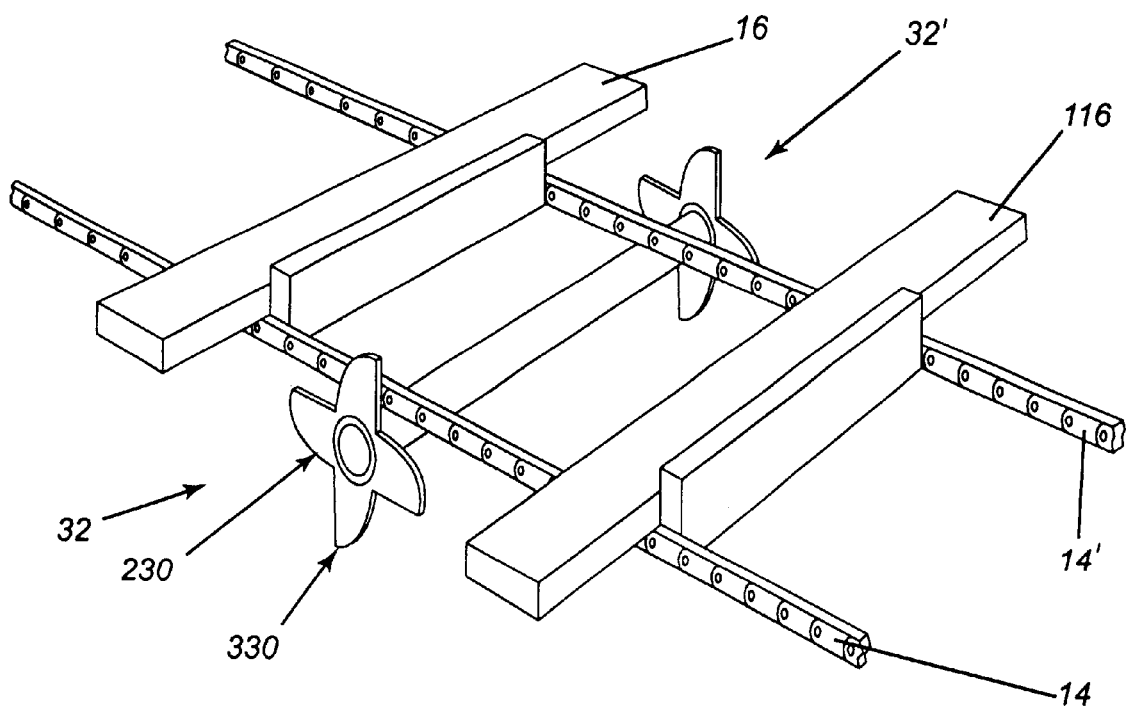
FIG. 24 is a perspective view illustrating a conveyer having a lumber turning device on both sides thereof.

As shown in FIG. 24, there are conventionally provided two members 32 and 32', one being situated on each side of the conveyer which includes a first chain 14 and a second chain 14'. A similar arrangement is provided in all instances of the lumber turning members.

It will be understood that the above described embodiments are for purposes of illustration only and that changes or modifications can be made thereto without departing from the spirit and scope of the invention.

I claim:

1. A lumber turning device for use with a conveyer having spaced apart lumber moving therealong, said device comprising:

a shaft;

a member rotatably mounted on said shaft, said member having a plurality of lobes extending radially outwardly with respect to said shaft;

indexing means to prevent free rotation of said member and to stop rotation thereof when said lobes are in desired position;

each of said lobes having an arcuate front surface and a rear surface;

the arrangement being such that when said device is mounted alongside said conveyer, a first one of said lobes will extend upwardly above said conveyer with a front surface facing a first lumber piece whereby when said first lumber piece contacts said front surface of said first one of said lobes, said member will rotate and a rear face of a adjacent lobe will lift said first lumber piece to rotate said first lumber piece through 180° and redeposit said first lumber piece on said conveyer.

2. The device of claim 1 wherein said device has four lobes spaced 90° apart.

3. The device of claim 2 wherein said front face has an arcuate surface.

4. A system for turning the lumber pieces on a conveyer having spaced apart lumber moving therealong, said system comprising first and second lumber turning devices as defined in claim 1 situated along either side of said conveyer.

5. A lumber turning device for use with a conveyer having spaced apart lumber moving therealong, said device comprising:

a shaft;

a first member mounted on said shaft;

means for rotating said shaft, said means for rotating said shaft being synchronized with the conveyer speed;

said first member having an arm extending radially outwardly therefrom, said arm having a wood abutment surface and a wood turning surface, said wood abutment surface and said wood turning surface being angled with respect to each other;

the arrangement being such that in a first position, said arm has said wood abutment surface positioned to contact said first side surface of a first piece of lumber moving along said conveyer and said wood turning surface being arranged to contact said bottom surface of said one piece of lumber and raise and turn said one piece of lumber through greater than 90° rotation such that said one piece of lumber is placed on said conveyer with said top and bottom surfaces being reversed.

6. The lumber turning device of claim 5 wherein said first member has a second arm extending radially outwardly therefrom, said second arm being diametrically opposed to said first arm, said second arm having a second arm wood abutment surface and a second arm wood turning surface mutually angled with respect to each other.

7. In a conveyer having spaced apart lumber moving therealong, the improvement comprising first and second lumber turning devices mounted on a side of said conveyer, each of said devices being as defined in claim 5.

8. The lumber turning device for use with a conveyer having spaced apart lumber moving therealong, said device comprising:

a shaft;

a lumber rotating member rotatably mounted on said shaft, said member having first and second arms extending radially outwardly with respect to said shaft;

drive means for rotatably driving said lumber turning member, said drive means being connected to a conveyer drive means; and each of said first and second arms having a respective front surface and rear surface, said front surfaces having a recess formed therein, said recesses being sized to receive one piece of lumber.

* * * * *